April 26, 1966     J. V. WISEMAN     3,247,837
ANNULAR SAW AND TENSION MEANS

Filed Dec. 30, 1963     2 Sheets-Sheet 1

INVENTOR.
JOE V. WISEMAN
BY Morris Rabkin
Attorney

April 26, 1966   J. V. WISEMAN   3,247,837
ANNULAR SAW AND TENSION MEANS
Filed Dec. 30, 1963   2 Sheets-Sheet 2

INVENTOR.
JOE V. WISEMAN
BY
Morris* Rabkin
ATTORNEY

United States Patent Office 3,247,837
Patented Apr. 26, 1966

3,247,837
ANNULAR SAW AND TENSION MEANS
Joe V. Wiseman, Toledo, Ohio, assignor to Radio Corporation of America, a corporation of Delaware
Filed Dec. 30, 1963, Ser. No. 334,294
2 Claims. (Cl. 125—15)

This invention relates to a device for turning two coaxial elements with respect to each other and is particularly useful for turning a saw blade tensioning ring with respect to a saw blade mounting ring when applying tension to an annular saw blade of which the inner edge is the cutting edge.

In cutting such materials as quartz crystals, germanium or silicon into thin slices in the process of producing frequency controlling devices, diodes, transistors, or the like, the quartz or germanium or silicon material may be encapsulated into a plastic holder which is fed to the inner cutting edge of a rotating, annular slicing saw. The rotating saw and the encapsulated material are moved with respect to each other in such a manner as to slice off thin slices of material. The thinner the saw, the less material is lost in the cutting. However, as the saw becomes thinner, its stiffness is reduced, whereby the saw may wobble, and occasionally it may break, as it cuts into the material, whereby accurate cutting does not take place and valuable material may be wasted. It has been found that, if the annular saw is tensioned in a radially outward direction from the cutting edge, the tensioning of the blade acts to stiffen it, whereby a thinner, tensioned blade may be as stiff as a thicker, untensioned blade. By the use of such thinner, tensioned blade, the likelihood of its wobbling or breaking is reduced, and less material is lost in the cutting.

An annular saw blade, which is mounted by clamping it between two mounting rings, may be tensioned radially by so distorting the saw blade as to form an annular depression in the blade concentric with the cutting edge and adjacent the mounting rings. The depression forming means may comprise a tensioning ring which is externally threaded to fit internal threads provided on one of the mounting rings. An annular ridge is formed on one side of the tensioning ring. The other or unthreaded mounting ring may have an annular groove in a side thereof facing the annular ridge. The tensioning ring is threaded into the threaded mounting ring until the ridge contacts the saw blade and forces the material of the blade into the groove whereby an annular depression is formed in the saw blade. The gathering of the saw blade material into this depression causes radial tensioning of the blade. The degree of tensioning depends on the depth of the annular depression. Turning the tensioning ring to tension or to increase the tension in the saw blade requires considerable physical effort.

Prior art means for rotating the tensioning ring with respect to the mounting ring comprise spanner wrenches. Axially directed holes are provided in the threaded mounting and tensioning rings. The saw blade mounting rings are prevented from rotating by mounting the blade supporting head on a fixed assembly stand. At this time, the tensioning ring may be turned with respect to the mounting rings by a spanner wrench engaging the holes in the tensioning ring. If tensioning must take place while the blade and its mounting head are in sawing position on the sawing machine, where the saw head is freely rotatable, a pair of spanners is used, one spanner engaging the holes in the threaded mounting ring and the other spanner engaging the holes in the tensioning ring. Use of such spanner wrenches involves hard, physical labor, and accurate, uniform, reproducible tensioning of the saw blade by using spanner wrenches is difficult, if not impossible. Too great tension on the blade may rupture it or cause it to rupture during subsequent use. Too little tension on the blade may result in insufficient stiffness. In either case, the blade does not operate properly and valuable material may be wasted. Furthermore, the blade provides a reduced number of cuts before it must be resharpened or replaced.

An object of this invention is to provide an improved device for turning two coaxial elements with respect to each other.

More particularly, it is an object of this invention to provide an improved device for turning a tensioning ring with respect to the mounting means for an annular saw blade of which the inner edge is the cutting edge.

It is a still further object of this invention is provide an improved device for turning a tensioning ring with respect to the mounting means of an annular saw blade by which accurate and reproducible tensioning of the saw blade is facilitated.

In accordance with this invention, a plurality of rotatably interfitting collars are provided on a common axis, one of said collars having pins fitting the holes in a mounting ring for the annular saw and the other collar having pins fitting the holes in the tensioning ring. A worm wheel is coaxially fixed to one of said collars and a mating worm gear is mounted for rotation about an axis perpendicular to said common axis on the other of said collars. When the pins in the collars extend into their respective holes in the rings, then, by turning the worm gear, the tensioning ring may be rotated with respect to the mounting ring to tension the blade. This blade tensioning can take place on the assembly stand which prevents the mounting rings from turning, or this tensioning may take place in the sawing position of the blade in which the saw mounting rings are free to rotate. Due to the mechanical advantage provided by worm gear and worm wheel, the effort required to turn the worm gear may be much less than the effort required to rotate the spanner wrench or wrenches of the prior art, and the degree of tightening may be measured by using a torque wrench to turn the worm gear, whereby the blade may be tightened accurately and to the same degree for each different blade.

The worm gear may be pivotally mounted for rotation about an axis parallel to the common axis between worm gear and worm wheel meshed and unmeshed positions for ease of applying the ring turning means to the mounting and tensioning rings and also for ease in removing the ring turning means after the tightening operation.

The novel features of the invention, both as to its organization and method of operation, as well as additional objects and advantages thereof, may be understood more readily from the following description when read in conjunction with the accompanying drawings, in which.

Figure 4:
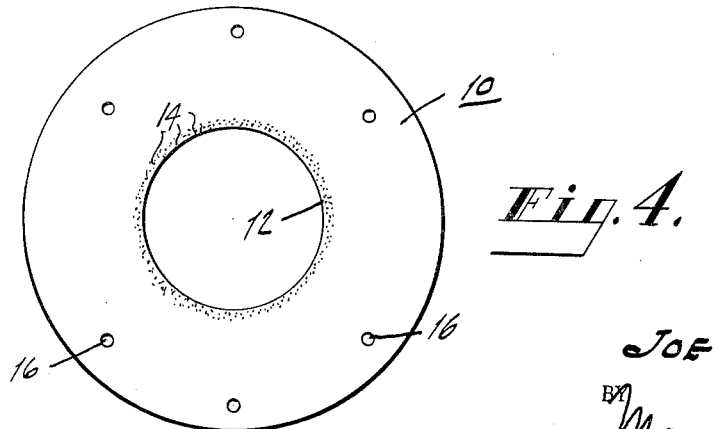
FIG. 4 is a plan view of a saw blade to be tensioned by the device of FIG. 1.

The annular saw blade 10 of FIG. 4, which may be tensioned by the device of this invention, comprises a circular sheet of material such as steel having a large central hole 12 therethrough. Diamond dust 14 is secured to the inner edge and to the sides of the saw 10 adjacent the central hole 12 whereby the inner edge and the sides of the hole adjacent the inner edge can do the cutting. Holes 16 adjacent to the outer edge of the saw blade are provided for mounting the saw blade on a mounting head 22 between mounting rings 18 and 20, shown in FIGS. 2 and 3.

Figure 3:
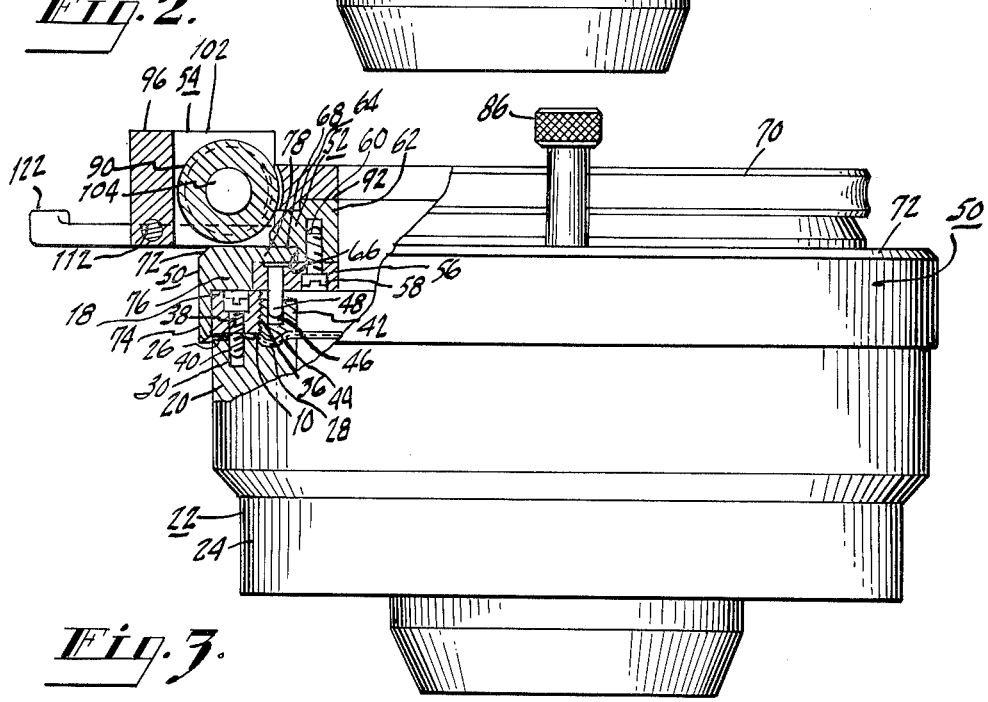
FIG. 3 is a side elevational view as viewed in the direction of the arrow B of FIG. 1, parts of this figure also being in sections.

In the use of this saw blade, it is mounted on the mounting head 22 which is rotated at its proper speed on its axis, while the material to be cut, which may be encapsulated, is fed to the cutting edge of the blade 10. The mounting head 22 comprises a cylindrical support 24 to which the mounting ring 20 is fixed. This mounting ring 20 has an end surface the radially outer or marginal portion 26 of which is flat and the relatively radially inner portion of which is formed to provide an annular groove 28. A plurality of threaded holes 30 (only one of which is shown in FIG. 3) are provided in the ring 20, the holes 30 being equal in number to the number of holes 16 in the saw blade 10 and being positioned to register therewith when the saw 10 is mounted on the mounting ring 20. These holes 30, which extend parallel to the axis of the mounting head 22, extend into the ring 20 through the flat portion 26 thereof.

The mounting head 22 also comprises the aforementioned mounting ring 18 which has the same outer diameter as the mounting ring 20 and which has threaded holes 32 (FIG. 2) therein extending parallel to the axis of the ring to receive threaded drive pins 34. This mounting ring 18 has a threaded inner surface 36 having a diameter a little less than the inner diameter of the flat portion 26 of the surface of the ring 20. Unthreaded holes 38 (FIG. 3) that register in position with the threaded holes 30 in the mounting ring 20 extend into the mounting ring 18 parallel to its axis. The holes 38 in the ring 18 have two diameters, the upper, larger diameter portion of each hole 38 (as viewed in FIG. 3) being adapted to receive the cap of each of a like number of cap screws 40, and the smaller diameter portion of each hole 38 being adapted to receive the shank of the cap screw 40.

A tensioning ring 42, which serves to tension the saw blade 10, has an external threaded surface which meshes with the internal threaded surface 36 of the ring 18. The tensioning ring 42 also has an annular ridge 44 extending axially from the side surface thereof, and holes 46 are provided in the tensioning ring 42 parallel to the axis thereof to receive drive pins 48.

The saw blade 10 is mounted by placing it on the mounting ring 20 with the holes 16 therein in registry with the threaded holes 30 in the mounting ring 20. The other mounting ring 18 is placed on the saw blade 10 with the unthreaded holes 38 therein in registry with the threaded holes 30 in the ring 20. The cap screws 40 are then dropped into the holes 38 in the ring 18 and are tightened down until the rings 18 and 20, as well as the saw blade 10, are securely fastened together. The blade is then tensioned by threading the tensioning ring 42 into the mounting ring 18 until the material of the saw blade 10 is pressed into the groove 28 by the ridge 44.

Figure 1:
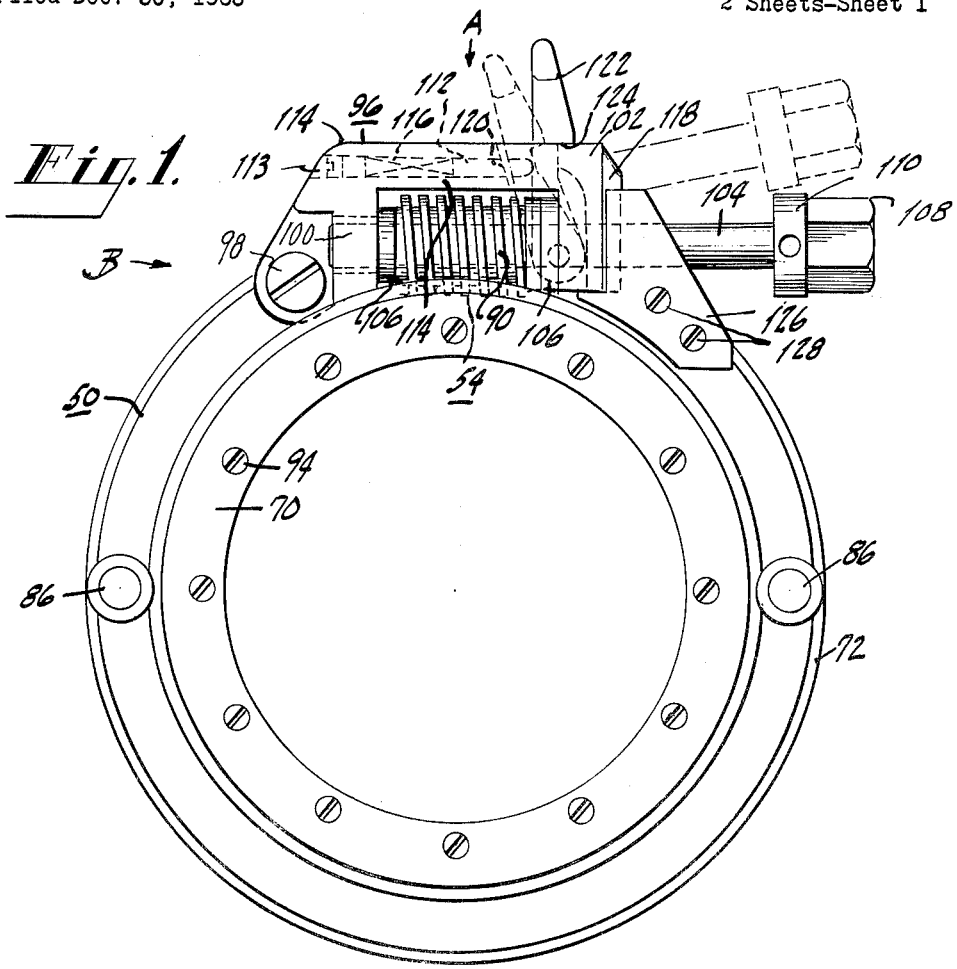
FIG. 1 is a plan view of a device for turning one of two concentric elements with respect to another in accordance with this invention.
Figure 2:
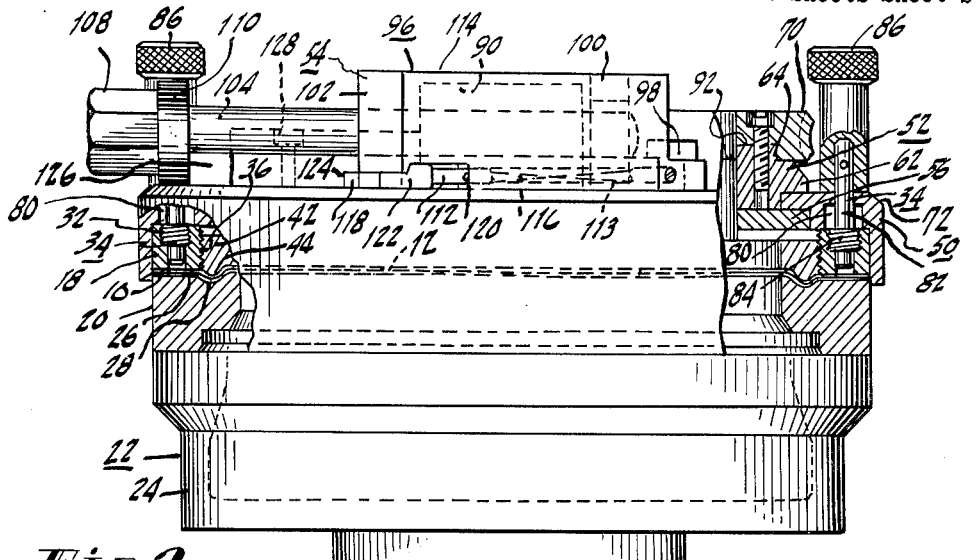
FIG. 2 is a side elevational view of the turning device of FIG. 1 as viewed in the direction of the arrow A, the device being mounted for tensioning an annular saw blade, and parts of the turning device and of the saw blade holding device or head being in section.

Means are provided to rotate the tensioning ring 42 with respect to the mounting ring 18. This means, which is shown in FIGS. 1 to 3, comprises two interfitting and relatively rotatable collars 50 and 52 and a worm drive means 54 to cause the collars 50 and 52 to rotate with respect to each other, as well as drive pins 34 and 48 held respectively by collars 50 and 52 and positioned to be received respectively in the registering and mating holes 32 and 46 in the mounting ring 18 and tensioning ring 42.

The inner collar 52 comprises an annulus 56 through which extend downwardly (as viewed in FIG. 3) the drive pins 48 to be received in the pin holes 46 in the tensioning ring 42. Holes 58 are provided through the annulus 56 extending parallel to the axis thereof, these holes 58 having two diameters. The upper, smaller diameter portion of each hole 58 is of a size to receive the shank of each cap screw 60. The larger diameter portion of each hole 58 is of a size to receive the cap of each cap screw 60. The inner collar 52 comprises a further annulus 62 having two smaller, outer diameter portions 64 and 66 joined by a larger diameter portion whereby, when the two annuli 56 and 62 are assembled, a groove 68 is provided therebetween for rotatably receiving a portion of the outer collar 50. The upper, smaller diameter portion 64 provides a mounting for a worm wheel 70 which is an element of the gear drive means 54.

The other or outer collar 50 is annular in shape and has a uniform outer diameter except that an outer corner thereof may be cut to form a chamfer 72. The outer collar 50 comprises stepped portions 74, 76 and 78 having different internal diameters, the lower portion 74, as viewed in FIGS. 2 and 3, being of a size to receive the mounting ring 18. The intermediate portion 76 of the collar 50 is of such a diameter as to rotatably receive the annulus 56. The top portion 78 of the collar 50 is of such a size as to be rotatably received in the groove 68 whereby, when the upper portion 78 of the outer collar 50 is received between the annuli 56 and 62 and the cap screws 60 are tightened to hold these annuli together, the outer collar 50 may be rotated with respect to the inner collar 52. The drive pins 34 are provided in the outer collar 50 positioned to register with the mating holes 32 in the mounting ring 18. These pins 34 (of which only two are shown) are slidably mounted in holes 80 in the outer collar. These holes 80 have a smaller diameter upper portion (as viewed in FIG. 2) and a larger diameter lower portion. The pins 34 that extend through these holes have a shank 82 of a size to slide through the upper portion of the respective holes 80 and an enlarged, threaded, intermediate portion 84 of a size to fit the lower portion of the holes 80. The pins 34 each also have a lower, guide portion which is smaller in diameter than that of the threaded portion 84 and is not threaded. The upper ends of the pins 34 fit into handles 86 above the collar 50 and are fixed to the handles 86 by any suitable means. The upper ends of the handles 86 have enlarged knurled end portions for convenience in sliding and rotating the pins 34 in their holes 80. The handle 86 acts as a stop to limit sliding of the pin 34 in a downward direction (as viewed in FIGURE 2) at a position wherein the threaded portion 84 is below the hole 80. The threaded portion 84 acts as a stop to limit sliding of the pin 34 in an upward direction at a position where the lower guide portion of the pin 34 extends below the collar portion 76 for a short distance, less than the distance the drive pin 48 extends below the bottom of the collar portion 76.

The worm drive means 54 for rotating the collars 50 and 52 with respect to each other includes the worm wheel 70 and a worm gear 90. The worm wheel 70, which is provided with a cylindrical seat 92 to receive the upper portion 64 of the upper annulus 62, is held against the upper part 64 of the annulus 62 by the cap screws 94 (FIG. 1). The worm gear 90, which meshes with the worm wheel 70, is pivotally mounted on the outer collar 50, as about to be described.

A holder 96 for the worm gear 90 is pivotally mounted on the outer collar 50 by means of a cap screw 98, whereby the holder 96 may pivot with respect to the collar 50 about an axis parallel to the axis of the collar. The holder 96 is of bracket-line form, providing a space for the worm gear 90 between the arms 100 and 102 of the holder 96. A shaft 104, having a head 108 and a flange 110 adjacent to its head, extends through aligned bearings in the arms 100 and 102 of the holder 96. The worm gear 90 is fixed to the shaft 104 between these arms. Thrust bearings 106 (FIG. 1) may be provided between the ends of the worm gear 90 and adjacent arms 100 and 102 of the holder 96. A pin 112 extending parallel to the shaft 104 is slidably mounted in a hole 113 in a bar portion 114 of the holder 96. The bar portion 114 connects the arms 100 and 102. A spring 116 urges the pin 112 in a direction towards the arm 102. The edge of the holder arm 102 adjacent the nut 108 is formed to provide a tongue 118. A notch 120 is provided in the lower surface of the bar 114 (as viewed in FIG. 1) adjacent the arm 102 to receive a swingable latch 122.

The latch 122 (best seen in FIG. 1) is pivotally mounted on the outer collar 50 and extends out through the notch 120 to provide an end portion beyond the bar 114 in a direction away from the collar 50. The latch 122 is provided with a notch 124 to receive a portion of the bar 114 adjacent the arm 102. The spring-pressed pin 112 contacts the latch 122 and urges it clockwise, as viewed in FIG. 1, to latching position. However, the latch may be moved counter-clockwise against the urging of the spring 116 to unlatched position.

A catch and stop means 126 is provided to stop rotation of the holder 96 in a clockwise direction (as viewed in FIG. 1) and to receive the tongue portion 118 of the holder arm 102 in the notch 124 of the catch 126 (FIGS. 1 and 2). The catch and stop means 126 is fixed to the outer collar 50 by suitable means, such as cap screws 128. Therefore, when the holder 96 is turned to its final clockwise position, the tongue 118 is received between the outer collar 50 and the notch 124 of the catch 126, and another portion of the catch 126 prevents further clockwise rotation of the holder 96.

In operation, the turning device is placed on the upper mounting ring 18, so that the axes of the mounting and tensioning rings and of the turning means are coincident, the upper mounting ring 18 being received in the lower part 74 of the outer collar 50, and the turning device is rotated until the pins 48 extending from the inner collar 52 fall into the mating holes 46 in the tensioning ring 42. The slidable pins 34 in the outer collar 50 are pushed up by the upper surface of the upper mounting ring 18 until the threaded portions 84 of the drive pins 34 are received in the enlarged portions of the holes 80, the lowest portion of the pins 34 extending below the lower surface of the intermediate portion 76 of the collar 50. Then, the latch 122 is moved to unlatching position and the shaft 104, the holder 96, and the worm gear 90 are rotated counter-clockwise, as viewed in FIG. 1, until the worm gear 90 does not mesh with the worm wheel 70. This position of the shaft and latch is shown in phantom in FIG. 1. At this time, the two collars 50 and 52 may be turned freely with respect to each other. Then, the outer collar is turned until a mark (not shown) on the outer collar 50 is in registry with a mark (not shown) on the mounting head 22. The guide portion 84 of the pins 34 may now enter into the holes 32 and the pins 34 are then pushed down and rotated until the outer collar 50 is tightly seated on the upper ring 18, the outer collar 50 and the upper ring 18 being prevented from rotating with respect to each other by the pins 34. The holder 96 is then rotated to the position where an edge of the arm 102 contacts the catch means 126 at which time the latch 122 will be rotated by the spring-pressed pin 112 to the position where it holds the holder 96 in its rotated position. In this position of the holder, the worm gear 90 and the worm wheel 70 will be in meshing relation, although it may be necessary to rotate the worm gear 90 through a small angle to permit such meshing.

The worm gear 90 may be turned on an axis transverse to the axis of the worm wheel 70 and in a direction to thread the tensioning ring 42 down, as viewed in FIGS. 2 and 3, to tension the saw blade 10, by applying a torque wrench (not shown) to the nut 108. Even if the head 22 on which the saw blade 10 is mounted is freely rotatable in both directions, as when the head 22 is mounted on the sawing machine, the saw blade may be tensioned by simply turning one nut, there being no necessity of providing a spanner wrench to prevent undesired rotation of the saw head. The amount of tensioning of the saw blade may be noted by observing the torque wrench scale, whereby the saw blade may be tensioned accurately.

While only two pins 34 are shown in the outer collar 50, there may be as many pins as may be desired. Similarly, as many pins 48 and mating holes 46 may be provided as are desirable. To make the turning device adjustable to cooperate with saw blade mounting rings and tensioning rings of different diameters, the pins 34 and 48 may be mounted in radial slots, whereby the radial positions of the pins may be adjusted. To make the turning device adjustable to cooperate with saw blade mounting rings and tensioning rings having holes 32 and 46 in different angular positions, a plurality of radial slots may be provided and pins may be inserted in only those slots which register with the holes in the mounting and tensioning rings.

Although only a single turning device structure has been described, it will undoubtedly be apparent to those skilled in the art that variations therein are possible within the spirit of the present invention. For example, the pins in either the outer collar or the inner collar may be slidably mounted and threaded to mesh with threaded mating holes. Other variations are also possible within the scope of this invention. Hence, it should be understood that the above described turning device is to be taken as illustrative and not in a limiting sense.

What is claimed is:

1. Means for turning with respect to each other inner and outer rings having a common axis, said rings each having at least one pin receiving hole extending parallel to said axis, said means comprising
   (a) a first and a second collar having a common axis,
   (b) a worm wheel having an axis, said worm wheel being fixed coaxially to said first collar,
   (c) said collars being connected together for rotation one with respect to the other about their common axis,
   (d) at least one pin fixedly mounted in one of said collars extending from said one collar in one direction parallel to the axis thereof for a predetermined distance and positioned to be received by a mating pin receiving hole in one of said rings,
   (e) at least one further pin slidably mounted in the other of said collars and extending parallel to the axis thereof from said other of said collars in said direction and positioned to be received by a mating pin receiving hole in the other of said rings, stop means on said slidable pin for limiting sliding thereof at two positions, in one of which the end of said sliding pin extends beyond said other collar for a given distance other than zero and less than said predetermined distance, and in the other position of which said sliding pin extends beyond said collar further than said given distance,
   (f) a worm gear mounted on said second collar for rotation about an axis transverse to the common axis of said collars and pivotally movable to and from either of two positions in one of which said worm wheel and said worm gear are in mesh and in the other of which said worm wheel and said worm gear are out of mesh,
   (g) said turning means being so mountable on said rings that the common axis of said collars and said rings coincide, and
   (h) said means being rotatable about said common axis until said first mentioned pin falls into a mating pin receiving hole in one of said rings whereby said slidable pin is caused to slide by contact with the other of said rings.

2. In sawing apparatus wherein a saw blade is held in sawing position with the aid of a saw blade mounting ring having an axis and at least one threaded pin receiving hole extending parallel to said axis, and wherein a saw blade tensioning ring is included for tensioning said blade, said tensioning ring having an axis common with that of said mounting ring and threadedly engaging said mounting ring for turning thereon, said tensioning ring having a pin receiving hole parallel to said axis, the improvement comprising means for effecting relative turning between said mounting ring and said tensioning ring, said turning means comprising (a) a first and a second collar, said collars being mounted on a common axis, (b) a worm wheel having an axis, said worm wheel being fixed coaxially to one of said collars, (c) at least one slidable, threaded pin extending from the other of said collars in a predetermined direction parallel to said axis thereof and positioned to be received by said threaded pin receiving hole in said mounting ring, (d) at least one further pin extending from said one collar in said predetermined direction parallel to the axis thereof and positioned to be received by said pin receiving hole in said tensioning ring, (e) a worm gear carried by said other collar for rotation about an axis transverse to the common axis of said collars, and (f) said worm gear being pivotally movable to and from either of two positions in one of which said gear wheel and said worm wheel are in mesh and in the other of which said gear wheel and said worm wheel are out of mesh, said turning means being mountable on said rings with the common axis of said rings coincident with the common axis of said collars, and said turning means being rotatable about said common axis until said second mentioned pin falls into said mating pin receiving hole in said tensioning ring whereby said slidable pin is caused to slide by contact with the other of said rings, the other of said collars being rotatable on said common axis when said worm gear and said worm wheel are out of mesh until said threaded slidable pin may be threaded into the mating threaded pin receiving hole in said mounting ring.

References Cited by the Examiner

UNITED STATES PATENTS

| 1,190,808 | 7/1916 | Stoiber | 74—405 |
| 1,262,235 | 4/1918 | Murray | 74—405 |
| 1,606,732 | 11/1926 | Haiss | 74—405 |
| 1,665,835 | 4/1928 | Bagby | 74—425 |
| 1,927,383 | 9/1933 | Bardwell | 81—57 |
| 2,713,339 | 7/1955 | Sayers | 125—15 |
| 3,034,371 | 5/1962 | Cantalupo et al. | 74—431 |
| 3,039,235 | 6/1962 | Heinrich | 51—73 |
| 3,161,014 | 12/1964 | Abild | 74—405 |

HAROLD D. WHITEHEAD, *Primary Examiner.*